(12) United States Patent
Wu et al.

(10) Patent No.: US 12,112,545 B2
(45) Date of Patent: Oct. 8, 2024

(54) CATENARY ICING DETECTION METHOD BASED ON INFRARED IMAGING AND METEOROLOGICAL MONITORING

(71) Applicant: Nanjing Joint Institute for Atmospheric Sciences, Nanjing (CN)

(72) Inventors: Hong Wu, Nanjing (CN); Yong Li, Nanjing (CN); Duanyang Liu, Nanjing (CN); Linyi Zhou, Nanjing (CN); Shoupeng Zhu, Nanjing (CN); Chengying Zhu, Nanjing (CN); Yan Zeng, Nanjing (CN); Hao Wu, Nanjing (CN); Wei Qian, Nanjing (CN)

(73) Assignee: NANJING JOINT INSTITUTE FOR ATMOSPHERIC SCIENCES, Nanjing (CN)

( * ) Notice: Subject to any disclaimer, the term of this patent is extended or adjusted under 35 U.S.C. 154(b) by 0 days.

(21) Appl. No.: 18/595,538

(22) Filed: Mar. 5, 2024

(65) Prior Publication Data
US 2024/0303993 A1 Sep. 12, 2024

(30) Foreign Application Priority Data
Mar. 7, 2023 (CN) .......................... 202310210056.9

(51) Int. Cl.
*G06V 20/52* (2022.01)
*G06T 5/50* (2006.01)
*H04N 23/11* (2023.01)

(52) U.S. Cl.
CPC ............... *G06V 20/52* (2022.01); *G06T 5/50* (2013.01); *H04N 23/11* (2023.01); *G06T 2207/20081* (2013.01); *G06T 2207/20221* (2013.01)

(58) Field of Classification Search
CPC . G06V 20/52; G06T 5/50; G06T 2207/20081; G06T 2207/20221; H04N 23/11
See application file for complete search history.

(56) References Cited

U.S. PATENT DOCUMENTS 4,904,996 A * 2/1990 Fernandes ............ G01R 15/142
340/870.07
2013/0035901 A1 * 2/2013 Breed ................ G08B 21/0286
702/188

(Continued)

FOREIGN PATENT DOCUMENTS

| CN | 102129564 A | 7/2011 | |
| CN | 102721373 A | 10/2012 | |
| WO | WO-2015067235 A2 * | 5/2015 | ................ B60L 5/20 |

OTHER PUBLICATIONS

CNIPA, Notification of First Office Action for CN202310210056.9, May 13, 2023.

(Continued)

*Primary Examiner* — Jared Walker
(74) *Attorney, Agent, or Firm* — Zhigang Ma

(57) ABSTRACT

The disclosure provides a catenary icing detection method based on infrared imaging and meteorological monitoring. In the disclosure, infrared illumination is used to detect the target, real-time images of the target are obtained through an infrared imaging sensor, and meteorological data are synchronously obtained through a meteorological monitoring unit, and normalized fusion processing is performed; the data are stored in a front-end edge computing unit, and through the deep learning model, the states of water accumulation, snow accumulation and icing of the target are automatically identified, and then sent to a background system through a transmission unit.

6 Claims, 14 Drawing Sheets

(56) References Cited

U.S. PATENT DOCUMENTS

| | | | |
|---|---|---|---|
| 2016/0284075 A1* | 9/2016 | Phan | H04N 23/11 |
| 2020/0133257 A1* | 4/2020 | Cella | G05B 19/4183 |
| 2021/0153752 A1* | 5/2021 | Park | A61B 5/1176 |
| 2021/0180571 A1* | 6/2021 | Yang | G06N 3/08 |
| 2022/0166907 A1* | 5/2022 | Hallgren | G01J 3/0289 |
| 2023/0415786 A1* | 12/2023 | Sainio | B60W 60/00259 |

OTHER PUBLICATIONS

Nanjing Meteorological Science and Technology Innovation Research Institute (Applicant), Reply to Notification of First Office Action for CN202310210056.9, w/ (allowed) replacement claims, May 23, 2023.

CNIPA, Notification to grant patent right for invention in CN202310210056.9, May 26, 2023.

* cited by examiner

CATENARY ICING DETECTION METHOD BASED ON INFRARED IMAGING AND METEOROLOGICAL MONITORING

TECHNICAL FIELD

The disclosure belongs to a technical field of artificial intelligence and weather forecast, and in particular to digital image processing and rail transit catenary icing monitoring technology.

BACKGROUND

As a crucial mode of traction for China's railway and urban rail transit systems, any freezing of the catenary can result in serious accidents, such as poor power collection by the pantograph, equipment burning due to arcs, and even disconnection of the catenary. These incidents pose a significant threat to the normal operation of rail transit and have a considerable impact on the economy and people's livelihood. If the icing situation is not found in time, it will take a lot of manpower and material resources to de-ice.

Currently, manual judgment based on weather conditions and video surveillance is the primary method used to detect snow and ice on catenary. Due to limited human resources, it is difficult to meet the actual needs in terms of detectable range and time.

Automatic icing identification using edge feature extraction algorithms for surveillance videos has been studied, but accurately identifying snow and thin ice remains a challenge. However, environmental light and background can easily influence the results, leading to misinformation and omissions. As a result, practical application has been challenging.

SUMMARY

In view of the above-mentioned existing problems and shortcomings, the disclosure provides a catenary icing detection method based on infrared imaging and meteorological monitoring. The disclosure uses infrared illumination to detect the target, improving target brightness and reducing interference from environmental light. The infrared imaging sensor provides real-time images of the target while the meteorological monitoring unit synchronously obtains meteorological data such as temperature, humidity, rainfall, snowfall, and wind speed. These data are stored in the front-end edge computing unit, and through the deep learning model, the states of water accumulation, snow accumulation and icing of the target are automatically identified, and then sent to the background system through the transmission unit.

In order to achieve the above purpose of the disclosure, the disclosure adopts a following technical scheme: a catenary icing detection method based on infrared imaging and meteorological monitoring, including following steps:

S1, obtaining original data: obtaining an infrared image and a visible light image in real time of a target catenary through a camera device, and synchronously obtaining meteorological data in real time, where the meteorological data includes temperature, humidity, rainfall, snowfall and wind speed;

S2, constructing a sample data set: normalizing original infrared and visible image data obtained in the S1, and fusing with the meteorological data to establish the sample data set of a model;

S3, constructing a deep learning model of MobileNetV3, and training the deep learning model of MobileNetV3 through the sample data set obtained in the S2 to obtain a trained deep learning model; and S4, evaluating and analyzing sample data through the deep learning model trained in the S3, so as to identify states of water accumulation, snow accumulation and icing on a surface of the target catenary.

Further, a process of constructing the sample data set in the S2 is as follows:

firstly, obtaining a surface temperature $T_0$ of the catenary by Formula (1), $$T_0 = \left\{ \frac{1}{\varepsilon}\left[\frac{1}{\tau_a}T_r^n - (1-\varepsilon)T_u^n - \left(\frac{1}{\tau_a} - 1\right)T_a^n\right] \right\}^{1/n}, \quad (1)$$

in the formula, $\varepsilon$ represents a surface emissivity of the catenary, and here $\varepsilon$ is 0.78 of copper; $\tau_a$ represents an atmospheric transmittance, with a value of 0.766; $T_r$ represents a radiation imaging value, and here $T_r$ is a pixel value corresponding to the infrared imaging image; a value of n is 5.33; $T_u$ represents an equipment ambient temperature (K) and $T_a$ represents an atmospheric temperature (K);

then, obtaining a Channel[0] value $R_t$ of R-channel in single-channel infrared image data by synthesizing through Formula (2):

$$R_t = (T_0 + R_0) \times U \quad (2),$$

in the formula, $R_t$ represents the Channel[0] value; $T_0$ represents the surface temperature of the catenary, $R_0$ represents an R-channel value of visible light, and U represents a collected humidity value, with a range of 0.0-1.0; and finally, fusing the Channel[0] value of R-channel in the synthesized infrared image data with a Channel[1] value of G-channel and a Channel[2] value of B-channel in the visible image as the sample data.

Further, the real-time infrared image has the same field of view as the visible image, and a resolution is 800*600.

Further, the emissivity of surface oxidized copper is taken as the value E of the surface emissivity of the catenary, that is, 0.78.

Further, a process of training the deep learning model MobileNetV3 in the S3 is as follows:

(1) first, setting a gradient descent rate of model learning as 0.001, inputting sample data into the model in batches, and calculating a model output loss loss (x) of the i-th sample data in the batch by Formula (3):

$$\text{loss}(x) = -\Sigma_{i=1}^{C} y_i \log f_i(x) \quad (3),$$

in the formula, x represents an input sample, C represents a total number of categories, with a value of 4; $y_i$ represents a real label corresponding to the i-th category; $f_i t$ (x) represents a corresponding model output value;

(2) then, calculating an average loss L of the sample data of the batch by Formula (4):

$$L = \frac{1}{n}\Sigma_i^n |\text{loss}(x)|, \quad (4)$$

in the formula, L represents the average loss of the batch; n represents a number of samples in the batch and loss (x) represents a loss value of a single sample;

(3) comparing the average loss L of the sample data of the batch with a model convergence threshold;

(4) completing the model training when L is less than a set model convergence threshold;

when L is greater than the set model convergence threshold, updating model parameters by an Adam optimizer and repeating steps (1)-(3) for iterative training until L is less than the set model convergence threshold or the number of iterations reaches a set value; and (5) finally, inputting a verification sample data set into the trained deep learning model MobileNetV3 for verification.

Further, the set value of the number of iterations in the step (4) of the S3 is 200.

Further, in the S1, when the real-time infrared image of the target catenary is obtained by the camera, the brightness of the target catenary is also improved by infrared illumination.

Compared with the prior art, the disclosure has following advantages: the disclosure is capable of automatically identifying the dry, wet, stagnant water, icing, snow and other states of the target catenary, sending the states to a background system through a transmission unit, and offering non-contact measurement, automatic identification of copper cables, and detection of target states. The disclosure is minimally affected by visible light and is capable of display various existing states simultaneously. The disclosure prioritizes detection of icing states and allows for result checking, improving reliability. Additionally, the disclosure enables real-time viewing and recording of current states through the background, thus improving the reliability; and the current status and records is capable of being viewed in real time through the background, and the equipment is small, light and convenient to install.

DETAILED DESCRIPTION OF THE EMBODIMENTS

The present disclosure will be further elucidated with reference to the attached drawings and specific embodiments. It should be understood that these embodiments are only used to illustrate the present disclosure and are not used to limit the scope of the present disclosure. After reading the present disclosure, various equivalent modifications of the present disclosure falls within the scope defined by the appended claims.

Figure 1:
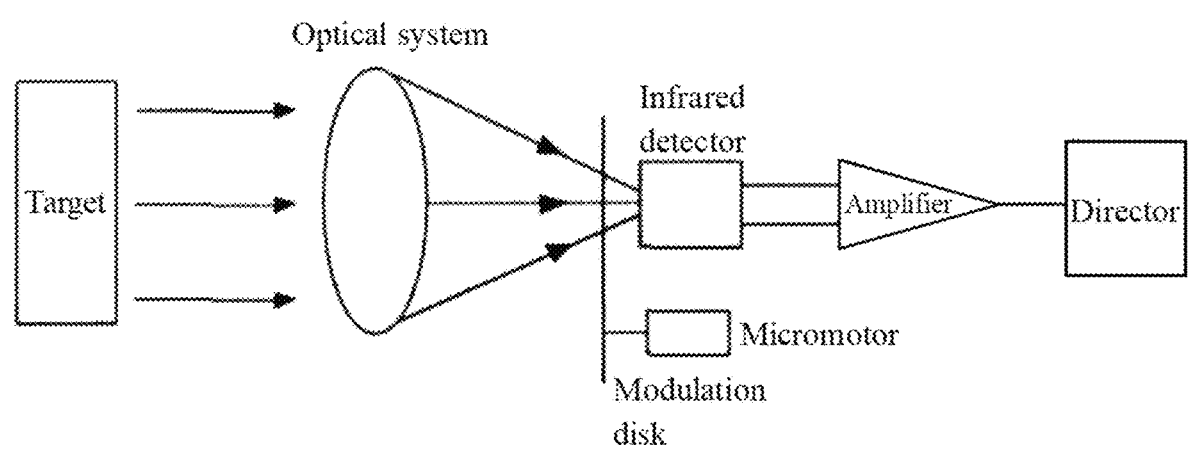
FIG. 1 is a schematic structural diagram of a catenary icing detection device based on infrared imaging and meteorological monitoring.
Figure 2:
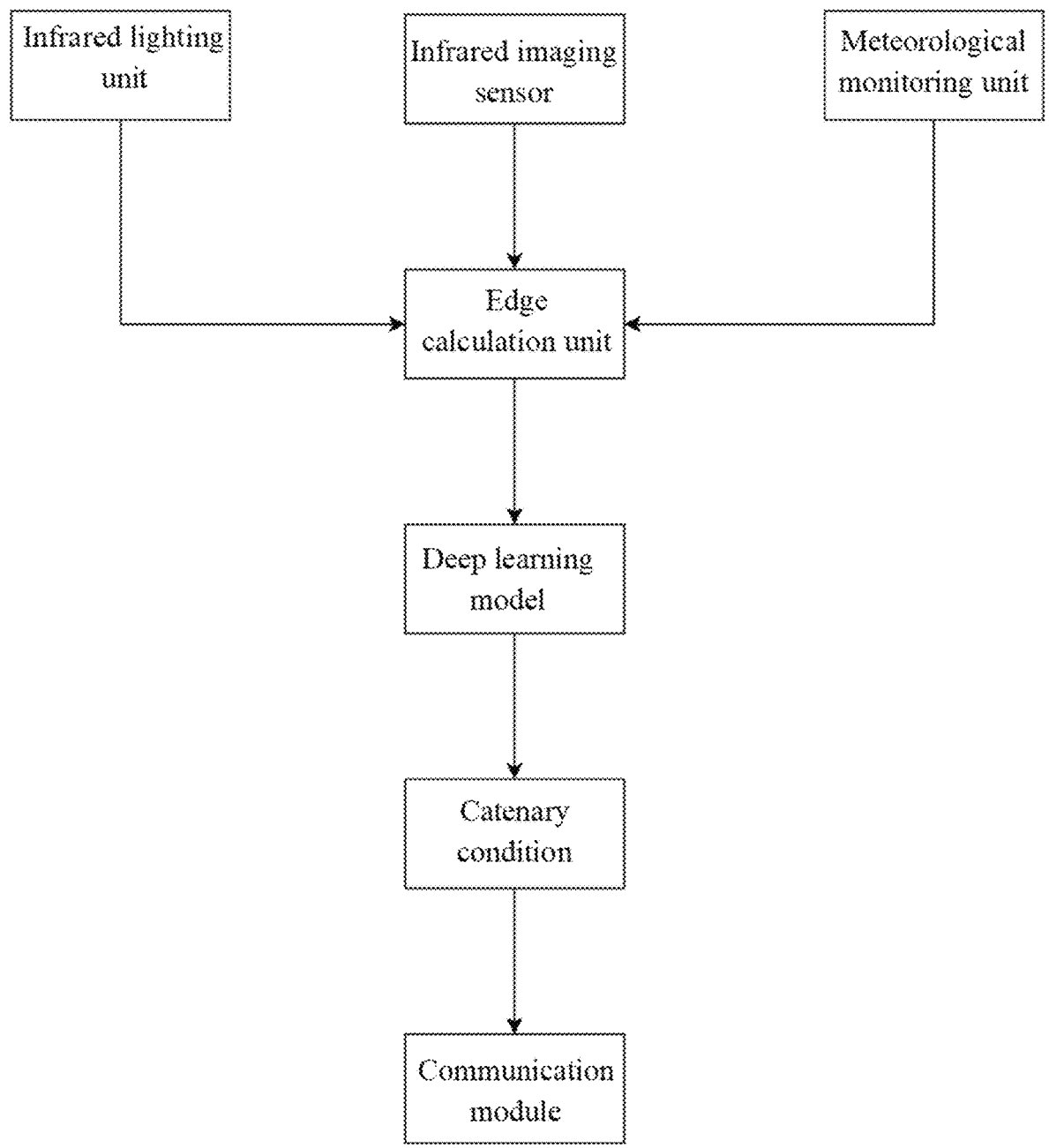
FIG. 2 is a schematic block diagram of a catenary icing detection system based on infrared imaging and meteorological monitoring.
Figure 3:
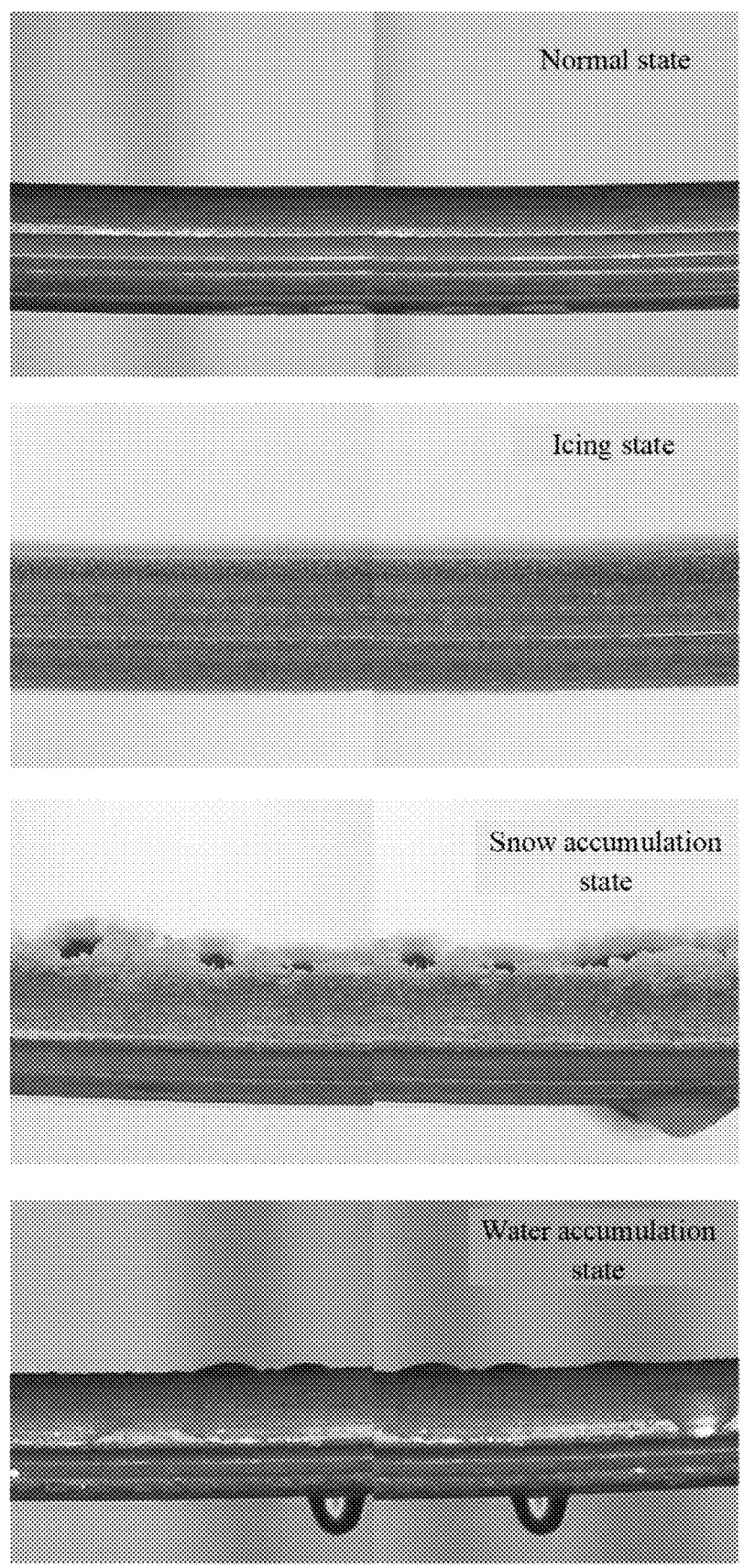
FIG. 3 is an infrared imaging diagram of a target catenary according to an embodiment of the present disclosure.

As shown in FIGS. 1-2, the catenary icing detection method based on infrared imaging and meteorological monitoring provided by the present disclosure is installed on the power supply poles beside the railway, so the equipment does not invade the track space. The installation interval between the infrared camera and the infrared light is 0.6 metre, and an edge calculation unit is installed in an equipment box below. The details are as follows:

an infrared lighting unit is included: the infrared lighting unit uses an infrared light source to illuminate the target, improve the brightness of the target and weaken the interference of environmental light; and the infrared lighting unit specifically includes following equipment: the infrared light source, a lens assembly and a synchronous control module;

an infrared imaging sensor is included: the infrared imaging sensor is used for obtaining an implementation image of the target, and the infrared imaging sensor includes an infrared coating lens, a polarizer, an image acquisition module and a synchronization control module;

an infrared imaging sensor is included: the infrared light reflected by objects in the scene is focused on an infrared detector by using optical components, and then the infrared data from each detector element is converted into a standard video format, as shown in FIG. 3, FIG. 3 shows infrared imaging images of the catenary in different states;

a meteorological monitoring unit is included: the environmental meteorological data of the target catenary of the disclosure synchronously acquires meteorological data (temperature, humidity, rainfall, snowfall, wind speed, etc.) based on the meteorological monitoring unit;

an edge calculation unit is included: the edge calculation unit automatically identifies a water-accumulated state, a frozen state, a snow-covered state through the deep learning model, and stores and outputs identification results. A deep learning module used in the edge calculation unit considers considers both video image data and meteorological data, and makes a unified normalization analysis instead of just analyzing image data;

and a transmission unit (communication module) is included: this unit uses NB-IoT or 5G communication link to send the water-accumulated state, the frozen state, the snow-covered state to the background system.

Figure 4:
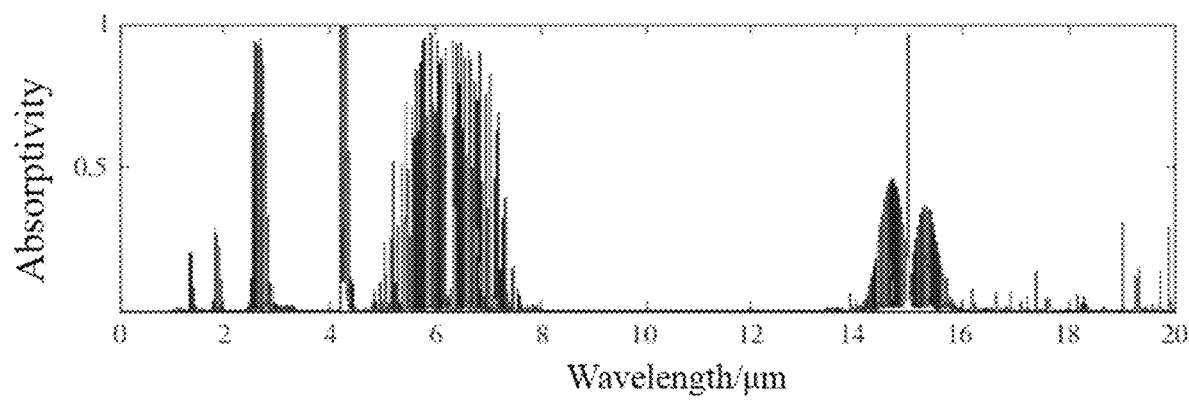
FIG. 4 is an absorption diagram of infrared rays by the atmosphere.

A principle of the disclosure lies in that infrared illumination is used to detect the target, so as to improve the brightness of the target and weaken the interference of environmental light; real-time images of the target are obtained through the infrared imaging sensor, and the meteorological data (temperature, humidity, rainfall, snowfall, wind speed, etc.) are simultaneously obtained through the meteorological monitoring unit. Infrared icing detection technology is mainly affected by a surface radiation coefficient, atmospheric conditions and temperature. The influence of radiation coefficient mainly lies in the difference of surface materials, thus leading to the different radiation ability of materials. A radiation coefficient of copper is about 0.78 (surface oxidation); a radiation coefficient of water is about 0.93; a radiation coefficient of ice is about 0.97. Therefore, for the icing on the catenary, because the radiation coefficient difference between copper and ice is relatively large, it is easier to distinguish whether the catenary surface is frozen by analyzing the infrared radiation wavelength. As shown in FIG. 4, an infrared absorption diagram of the atmosphere is shown.

These data are stored in the front-end edge computing unit, and through the deep learning model, the states of water accumulation, snow accumulation and icing of the target are automatically identified, and then sent to the background system through the transmission unit. The detection object is illuminated by the infrared light source with a specific wave band (which is conducive to penetrating and obtaining the image of ice and snow water droplets), and the original image is median filtered to filter out water droplets, ice cones, snowflakes and other small noises, the image of copper cable is retained, and the meteorological data are merged. The characteristics of dryness, water accumulation, snow accumulation and icing are extracted through a deep learning neural network.

Considering the front-end deployment of the system, the storage space, power consumption and computing power are relatively limited, a MobileNetV3 lightweight network is selected, and the working process of the MobileNetV3 lightweight network model of the present disclosure is described in detail as follows:

1. Building a Data Set

The analyzed object data includes visible light imaging data, infrared imaging image data and meteorological information data;

the visible light imaging data: the visible light imaging data is true color image data with an image size of 800×600; and includes three color channels: R, G and B;

the infrared imaging image data: the infrared imaging image data is thermal imaging image data collected by the infrared imaging camera, the image size is 800×600, and the infrared imaging image data is single channel image data. The field of view is the same as the field of view of the visible light image.

Temperature data: the surface temperature of the catenary is obtained by a following formula.

$$T_0 = \left\{ \frac{1}{\varepsilon} \left[ \frac{1}{\tau_a} T_r^n - (1-\varepsilon) T_u^n - \left( \frac{1}{\tau_a} - 1 \right) T_a^n \right] \right\}^{1/n}, \quad (1)$$

$T_0$: catenary surface temperature;
ε: an object emissivity, and here 0.78 of copper is taken;
$\tau_a$: atmospheric transmittance, a value of 0.766 is taken;
$T_r$: radiation imaging value, where a pixel value corresponding to the infrared imaging image is taken;
n: a value is 5.33 is taken;
$T_u$: equipment ambient temperature (K);
$T_a$: atmospheric temperature (K); and
humidity data: environmental humidity data collected by the on-site weather station.

Considering the front-end deployment of the system, the storage space, power consumption and computing power are relatively limited, and the MobileNetV3 lightweight network is selected. The MobileNetV3 algorithm is mainly aimed at the image data. In this method, the image data and temperature data are fused as the training data of the MobileNetV3 algorithm.

Following contents of the image are input:

Channel[0]: synthetic channel, and a data synthesis formula is:

$$R_r = (T_0 + R_0) \cdot U \quad (2),$$

$R_r$: channel[0] value;
$T_0$: surface temperature of the catenary, shown in Formula (1);
$R_0$: R-channel value of visible light;
U: collected humidity value (0.0-1.0);
Channel[1]: G-channel of the visible light image; and
Channel[2]: B-channel of the visible light image.

The three-channel R/G/B image data obtained above are used as sample data, and all sample data are divided into three data sets: a training set, a verification set and a test set according to proportions of 70%, 20% and 10%.

2. Constructing a Machine Learning Model

Figure 5:
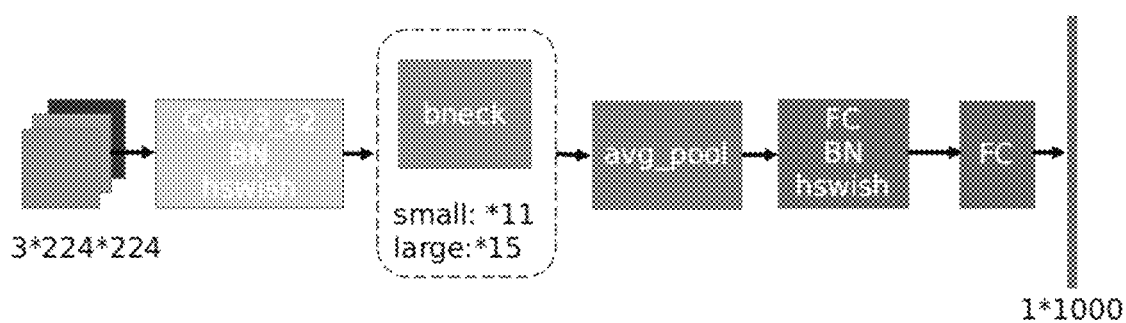
FIG. 5 is a schematic structural diagram of a MobileNetV3 lightweight deep learning network model according to the present disclosure.
Figure 6:
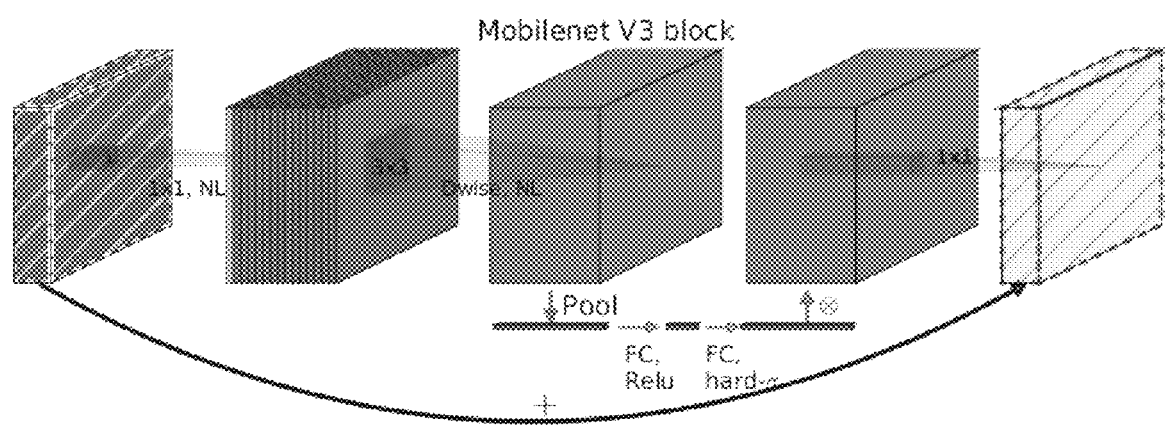
FIG. 6 is a schematic structural diagram of the core module Bneck in the MobileNetV3 lightweight deep learning network model according to the present disclosure.
Figure 7:
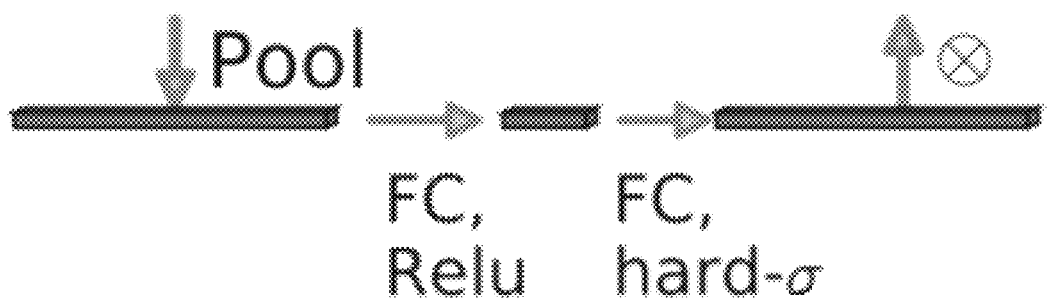
FIG. 7 is a schematic diagram showing action modes of each channel weight in the MobileNetV3 lightweight deep learning network model of the present disclosure.

Considering the front-end deployment of the system, the storage space, power consumption and computing power are relatively limited, the MobileNetV3 lightweight network is selected, and the overall structure is shown in FIGS. 5-7.

As the core module, Bneck is also the basic module of the network, which mainly realizes channel separable convolution+SE channel attention mechanism+residual connection. The structure is shown in FIG. 6 and includes the following:

an inverse residual structure: firstly, 1×1 convolution is used to upgrade the dimension, and there are residual edges;

a depth-separable convolution structure: the channel of each convolution kernel is equal to 1 (each convolution kernel is only responsible for one channel of the input feature matrix, and the number of convolution kernels must be equal to the number of channels of the input feature matrix, so that the number of channels of the output feature matrix is also equal to the number of channels of the input feature matrix). After the input 1×1 convolution is up-scaled, 3×3 depth separable convolution is performed; and a lightweight attention model: the function is to adjust the weight of each channel (as shown in FIG. 7).

The MobileNetV3 lightweight deep learning network model in the catenary icing detection method based on infrared imaging and meteorological monitoring of the disclosure adopts following activation functions:

$$ReLU(x) = \min(\max(x, 0), 6)$$

$$h-\text{swish}(x) = x\frac{ReLU6(x+3)}{6},$$

a loss function is selected: $\text{loss}\{x\} = -\Sigma_{i=1}^{C} y_i \log f_i \{x\}$, in the formula, x represents an input sample, C represents a total number of categories, with a value of 4; $y_i$ represents a real label corresponding to the i-th category; $f_i(x)$ represents a corresponding model output value;

an optimizer algorithm is constructed: Adam algorithm is selected in the disclosure:

$$t \leftarrow t+1$$
$$g_f \leftarrow \nabla_\theta f_t(\theta_{t-1})$$
$$m_t \leftarrow \beta_1 \cdot m_{t-1} + (1-\beta_1) \cdot g_t$$
$$v_t \leftarrow \beta_2 \cdot v_{t-1} + (1-\beta_2) \cdot g_t^2$$
$$\hat{m}_t \leftarrow m_t/(1-\beta_1^t)$$
$$\hat{v}_t \leftarrow v_t/(1-\beta_2^t)$$
$$\theta_t \leftarrow \theta_{t-1} - \alpha \cdot \hat{m}_t / (\sqrt{\hat{v}_t} + \varepsilon),$$

parameter description: t: t is a time step, initialized to 0; $g_t$ represents a gradient when the time step is t; θ represents a parameter to be updated; f(θ) represents a random objective function of the parameter θ; $\beta_1$ represents an exponential decay rate of the first moment, with a value of 0.9; $\beta_2$ represents an exponential decay rate of the second moment, with a value of 0.999; $m_t$ represents a first-order moment estimation of gradient, with an initial value of 0; $v_t$ represents a second-order moment estimation of gradient, with an initial value of 0; $\hat{m}_t$ represents a correction of $m_t$; $\beta_1^t$ represents the t-th power of $\beta_1$, $\hat{v}_t$ represents a correction of $v_t$; a represents a learning rate, with a value of 0.001; ε: a constant added for maintaining numerical stability, with a value of $=10e^{-8}$.

3. Model Training

Figure 8:
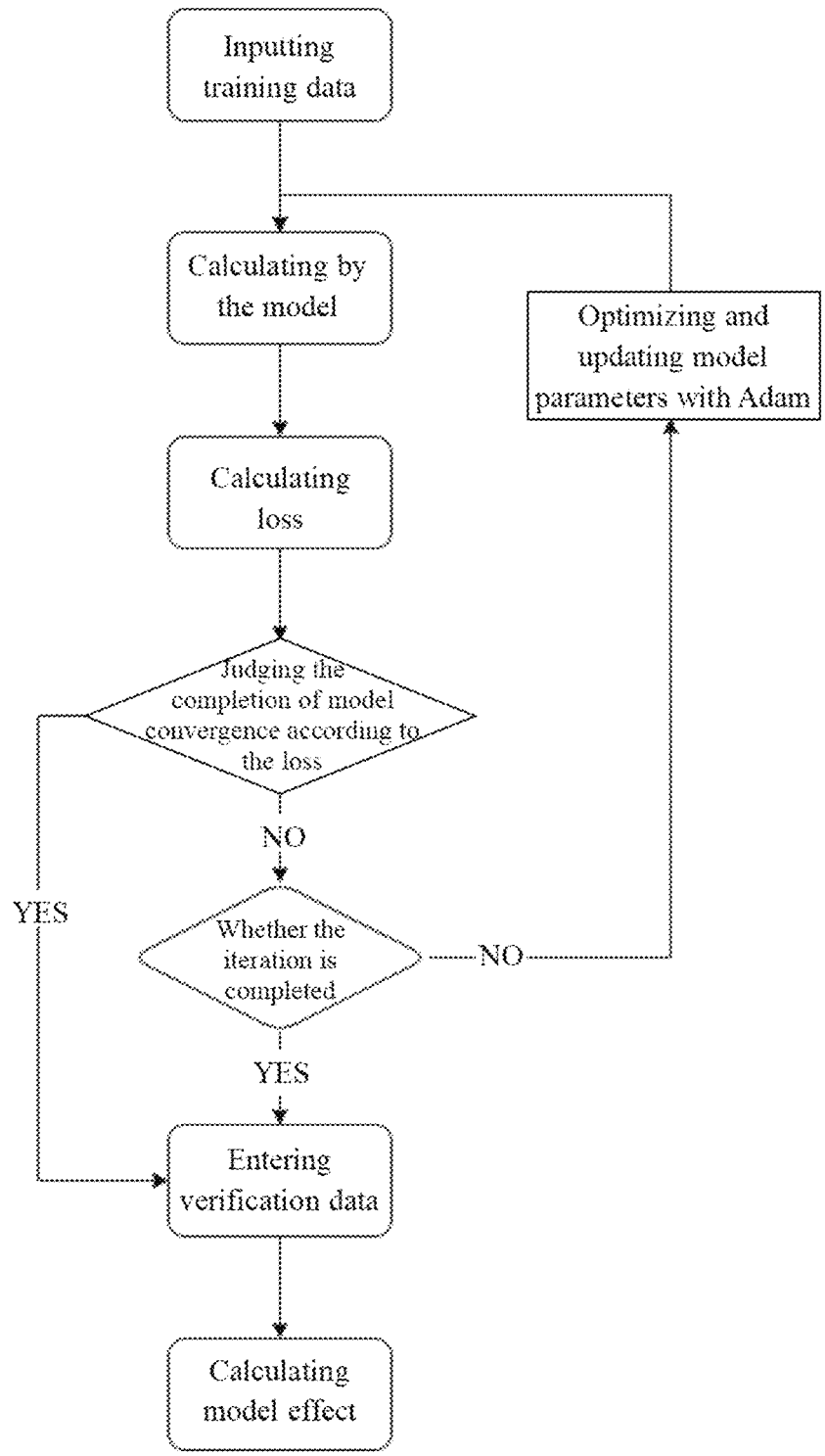
FIG. 8 is a training flow diagram of the MobileNetV3 lightweight deep learning network model according to the present disclosure.

The gradient descent rate of model learning is set as $1 \times e^{-3}$, as shown in FIG. 8, and the training model workflow is described in detail as follows:

(1) First, inputting the training data in the constructed data set into the model in batches, and calculating a model output loss loss (x) of the i-th sample data in the batch by Formula (3), where each batch of data set includes 16 groups of data, $$\text{loss}(x) = -\Sigma_{i=1}^{C} y_i \log f_i(x) \quad (3),$$

in the formula, x represents an input sample, C represents a total number of categories, with a value of 4; $y_i$ represents a real label corresponding to the i-th category; $f_t(x)$ represents a corresponding model output value;

(2) then, calculating an average loss L of the sample data of the batch by the loss function (4), $$L = \frac{1}{n}\Sigma_i^n |\text{loss}(x)|, \quad (4)$$

in the formula, L represents the average loss of the batch; n represents a number of samples in the batch, and the value is 16; and loss (x) represents a loss value of a single sample;

(3) comparing the average loss L of the sample data of the batch with a model convergence threshold;

(4) completing the model training when L is less than a set model convergence threshold and evaluating the model;

when L is greater than the set model convergence threshold, detecting whether the iteration is completed; if the preset number of iterations has not been reached, updating model parameters by an Adam optimizer and repeating steps (1)-(3) for iterative training until L is less than the set model convergence threshold or the number of iterations reaches a set value, and finally completing the model optimization; and finally, inputting a verification sample data set into the trained deep learning model MobileNetV3 for verification to evaluate the training effect of the model.

4. Evaluation Model Training Results

Figure 9:
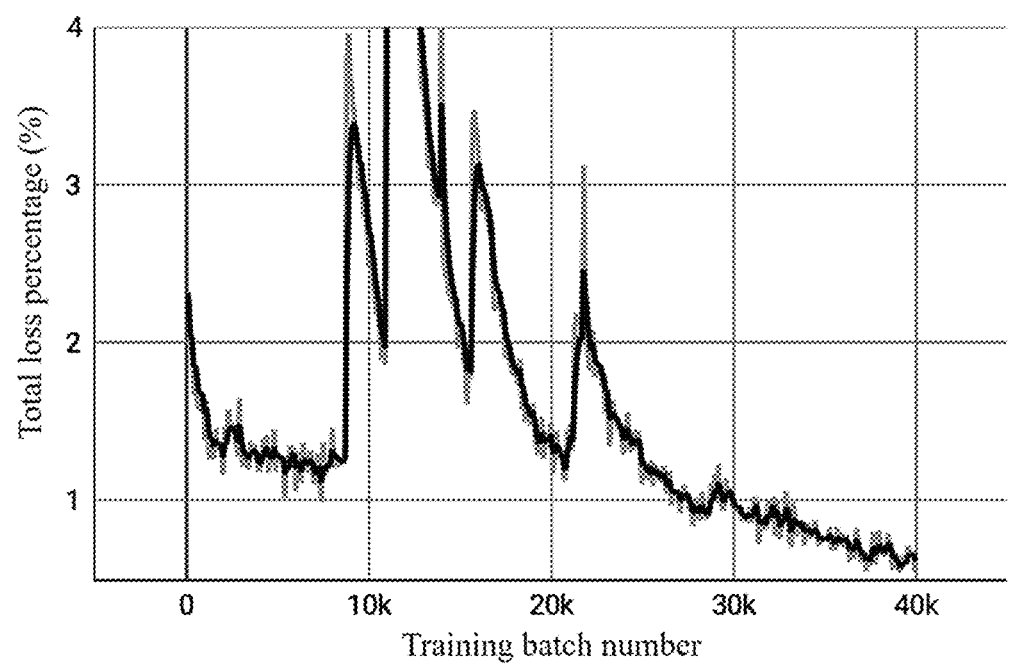
FIG. 9 shows a model training result according to an embodiment of the present disclosure, with the X-axis representing a training batch number and the Y-axis representing a total loss percentage.
Figure 10:
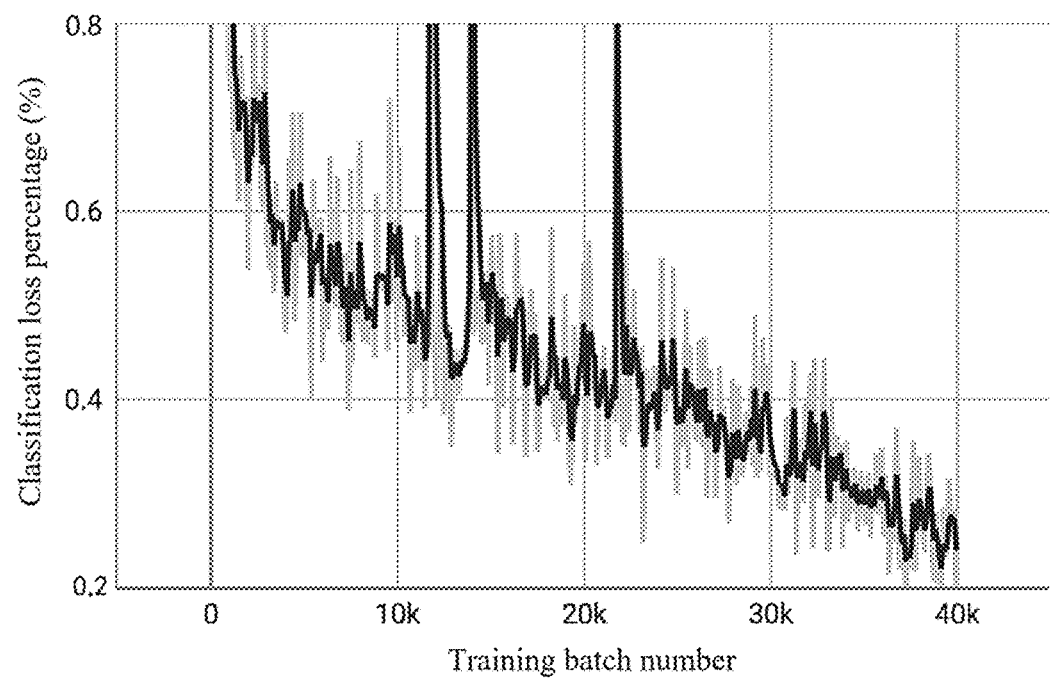
FIG. 10 shows a model training result according to an embodiment of the present disclosure, with the X-axis representing a training batch number and the Y-axis representing a classification loss percentage.
Figure 11:
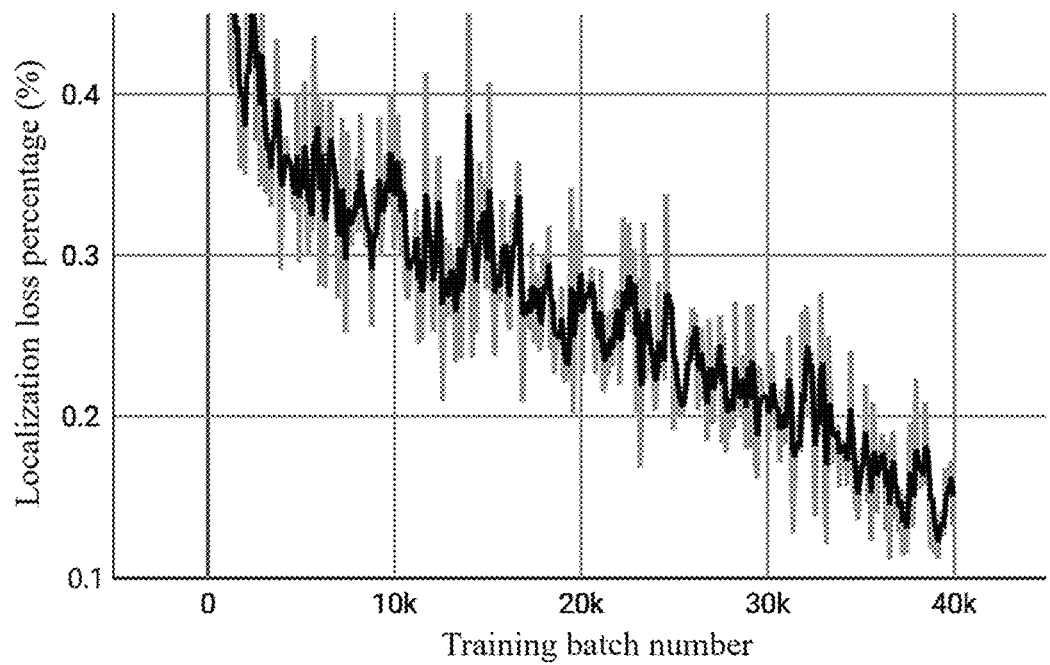
FIG. 11 shows a model training result according to an embodiment of the present disclosure, with the X-axis representing a training batch number and the Y-axis representing a localization loss percentage.
Figure 12:
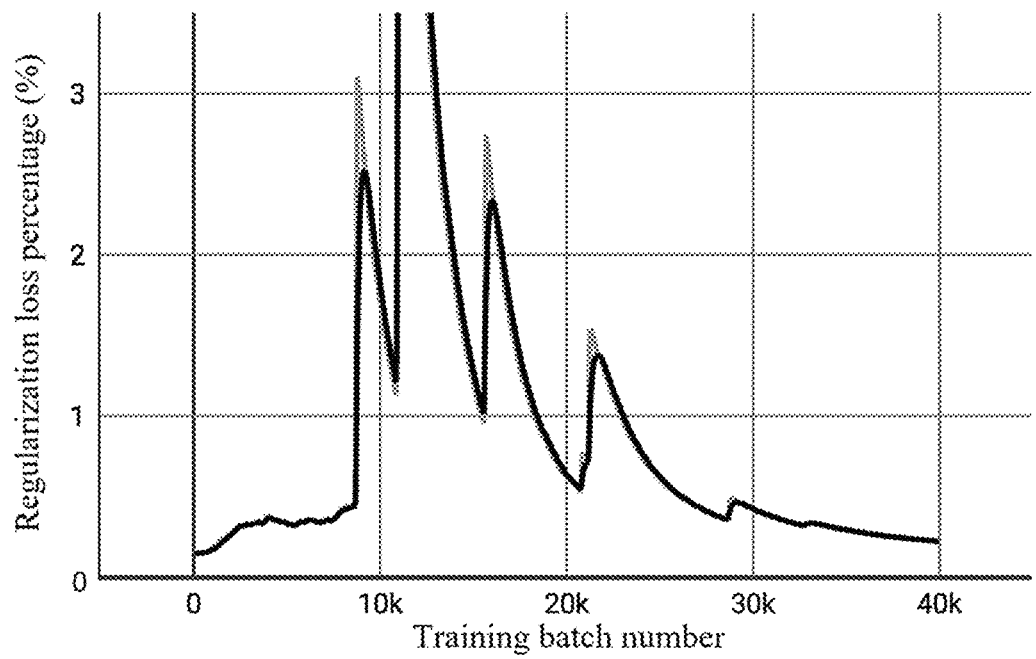
FIG. 12 shows a model training result according to an embodiment of the present disclosure, with the X-axis representing a training batch number and the Y-axis representing a regularization loss percentage.
Figure 13:
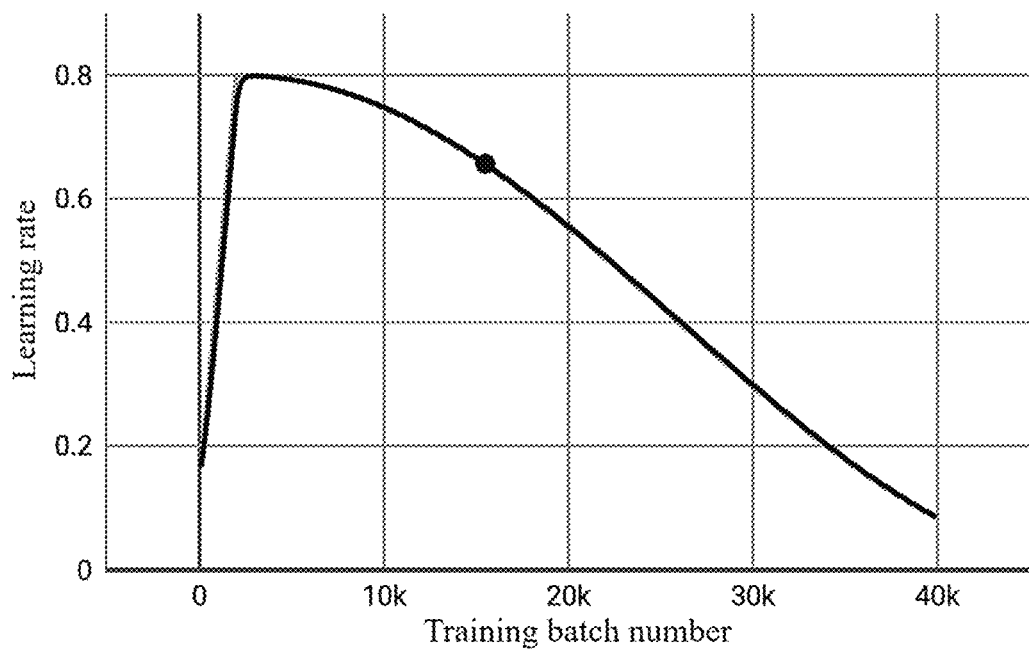
FIG. 13 is a model learning rate adjustment curve according to an embodiment of the present disclosure, with the X-axis representing a training batch number and the Y-axis representing a learning rate.

Evaluations of the training results of the MobileNetV3 model trained by the present disclosure are shown in FIGS. 9-14, where FIG. 9 shows a model training result according to an embodiment of the present disclosure, with the X-axis representing the training batch number and the Y-axis representing the total loss value. As shown in FIG. 9, the model parameter learning is unstable in the early stage, and the loss value fluctuates; in the later stage, with the increase of training batches, the total loss shows a continuous downward trend, and the last few batches are basically stable, with the optimal total loss of 0.5412;

FIG. 10 shows a model training result according to an embodiment of the present disclosure, with the X-axis representing the training batch number and the Y-axis representing the classification loss. As shown in FIG. 10, the model parameter learning is unstable in the early stage, and the loss value fluctuates; in the later stage, with the increase of training batches, the loss value continues to decline, and the last few batches are basically stable, with the optimal classification loss of 0.1886;

FIG. 11 shows a model training result according to an embodiment of the present disclosure, with the X-axis representing the training batch number and the Y-axis representing the localization loss. As shown in FIG. 11, with the increase of training batches, the loss value shows a continuous downward trend, and the last few batches are basically stable, with the optimal localization loss of 0.1283;

FIG. 12 shows a model training result according to an embodiment of the present disclosure, with the X-axis representing the training batch number and the Y-axis representing the regularization loss. As shown in FIG. 12, the model parameter learning is unstable in the early stage, and the loss value fluctuates; in the later stage, with the increase of training batches, the loss value continues to decline, and the last few batches are basically stable, with the optimal regularization loss of 0.2208;

FIG. 13 is a model learning rate adjustment curve according to an embodiment of the present disclosure, with the X-axis representing the training batch number and the Y-axis representing the learning rate. As shown in FIG. 13, the learning effect of model parameters in the early stage is not ideal, and the learning rate is continuously increased; in the later stage, with the increase of training batches, the learning effect is gradually improved; with the continuous convergence of the model, the learning rate is gradually reduced to avoid missing the minimum value, and the minimum learning rate is 0.08266.

To sum up, the training results in FIGS. 9-13 are basically consistent, the overall trend is consistent, and finally they can be stabilized in a reasonable range, indicating that the model training effect is ideal.

Figure 14:
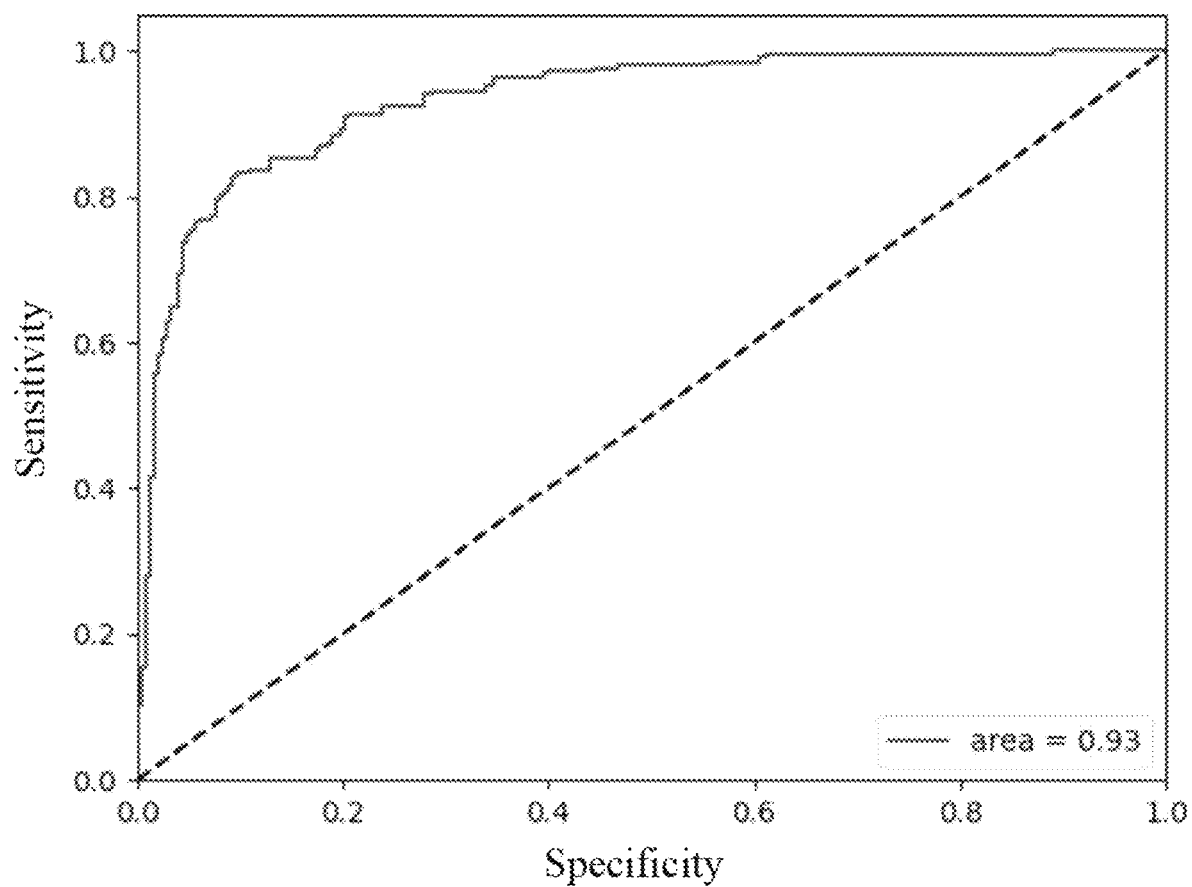
FIG. 14 is an ROC graph showing a model training effect according to an embodiment of the present disclosure, with the X-axis representing a specificity (false alarm rate), the Y-axis representing a sensitivity, and the area below the line representing AUC (Area Under Curve).

FIG. 14 is an ROC graph showing model training effect, and the X-axis represents 1-specificity (false alarm rate), and the closer to zero, the higher the accuracy rate; the Y-axis represents sensitivity, and the larger it is, the better the accuracy is. The area under the curve is called AUC (Area Under Curve), which is used to indicate the prediction accuracy. The higher the AUC value, that is, the larger the area under the curve, the higher the prediction accuracy. The AUC value of the model training result ROC graph is 0.93, showing an ideal effect in verifying the sample set.

Main innovative technologies of the disclosure are as follows: the infrared light supplement and the infrared imaging are adopted; the image data and the meteorological data input by the deep neural network are merged and communicated; the MobileNetV3 deep neural network is used to train and identify the merged image data and the meteorological data.

The above is only an optional embodiment of the present disclosure, but the scope of protection of the present disclosure is not limited to this. Any person familiar with the technical field should be included in the scope of protection of the present disclosure by replacing or changing it equally according to the technical scheme and technical concept of the present disclosure within the technical scope disclosed by the present disclosure.

What is claimed is:

1. A catenary icing detection method based on infrared imaging and meteorological monitoring, comprising following steps:

S1, obtaining original data: obtaining an infrared image and a visible light image in real time of a target catenary through a camera device, and synchronously obtaining meteorological data in real time, where the meteorological data includes temperature, humidity, rainfall, snowfall and wind speed;

S2, constructing a sample data set: normalizing original infrared and visible image data obtained in the S1, and fusing with the meteorological data to establish the sample data set of a model;

S3, constructing a deep learning model of MobileNetV3, and training the deep learning model of MobileNetV3 through the sample data set obtained in the S2 to obtain a trained deep learning model; and S4, evaluating and analyzing sample data through the deep learning model trained in the S3, so as to identify states of water accumulation, snow accumulation and icing on a surface of the target catenary;

wherein a process of constructing the sample data set in the S2 is as follows:

firstly, obtaining a surface temperature $T_0$ of the catenary by Formula (1), $$T_0 = \left\{ \frac{1}{\varepsilon}\left[\frac{1}{\tau_a}T_r^n - (1-\varepsilon)T_u^n - \left(\frac{1}{\tau_a}-1\right)T_a^n\right] \right\}^{1/n}, \quad (1)$$

in the formula, $\varepsilon$ represents a surface emissivity of the catenary, and here $\varepsilon$ is 0.78 of copper; $\tau_a$ represents an atmospheric transmittance, with a value of 0.766; $T_r$ represents a radiation imaging value, and here $T_r$ is a pixel value corresponding to the infrared imaging image; a value of n is 5.33; $T_u$ represents an equipment ambient temperature (K) and $T_a$ represents an atmospheric temperature (K);

then, obtaining a Channel[0] value $R_t$ of R-channel in single-channel infrared image data by synthesizing through Formula (2):

$$R_t = (T_0 + R_0) \times U \quad (2),$$

in the formula, $R_t$ represents the Channel[0] value; $T_0$ represents the surface temperature of the catenary, $R_0$ represents an R-channel value of visible light, and U represents a collected humidity value, with a range of 0.0-1.0; and finally, fusing the Channel[0] value of R-channel in the synthesized infrared image data with a Channel[1] value of G-channel and a Channel[2] value of B-channel in the visible image as the sample data.

2. The catenary icing detection method based on infrared imaging and meteorological monitoring according to claim 1, wherein the real-time infrared image has the same field of view as the visible image, and a resolution is 800*600.

3. The catenary icing detection method based on infrared imaging and meteorological monitoring according to claim 1, wherein the emissivity 0.78 of surface oxidized copper is taken as the value c of the surface emissivity of the catenary.

4. The catenary icing detection method based on infrared imaging and meteorological monitoring according to claim 1, wherein a process of training the deep learning model MobileNetV3 in the S3 is as follows:

(1) first, setting a gradient descent rate of model learning as 0.001, inputting sample data into the model in batches, and calculating a model output loss loss (x) of the i-th sample data in the batch by Formula (3):

$$\text{loss}(x) = -\Sigma_{i=1}^{C} y_i \log f_i(x) \quad (3),$$

in the formula, x represents an input sample, C represents a total number of categories, with a value of 4; $y_i$ represents a real label corresponding to the i-th category; $f_i(x)$ represents a corresponding model output value;

(2) then, calculating an average loss L of the sample data of the batch by Formula (4):

$$L = \frac{1}{n}\Sigma_i^n |\text{loss}(x)|, \quad (4)$$

in the formula, L represents the average loss of the batch; n represents a number of samples in the batch and loss (x) represents a loss value of a single sample;

(3) comparing the average loss L of the sample data of the batch with a model convergence threshold;

(4) when L is greater than the set model convergence threshold, updating model parameters by an Adam optimizer and repeating steps (1)-(3) for iterative training until L is less than the set model convergence threshold or the number of iterations reaches a set value; and (5) finally, inputting a verification sample data set into the trained deep learning model MobileNetV3 for verification.

5. The catenary icing detection method based on infrared imaging and meteorological monitoring according to claim 4, wherein the set value of the number of iterations in the step (4) of the S3 is 200.

6. The catenary icing detection method based on infrared imaging and meteorological monitoring according to claim 1, wherein in the S1, when the real-time infrared image of the target catenary is obtained by the camera, the brightness of the target catenary is also improved by infrared illumination.

* * * * *